US010102352B2

(12) United States Patent
Butcher et al.

(10) Patent No.: US 10,102,352 B2
(45) Date of Patent: Oct. 16, 2018

(54) CONTENT USAGE MONITOR

(75) Inventors: David John Butcher, King's Lynn (GB); Rhys David Copeland, Cambridge (GB); Robert James Catherall, Cambridge (GB); Jeremy Isle Johnson, Cambridge (GB)

(73) Assignee: ARM LIMITED, Cambridge (GB)

( * ) Notice: Subject to any disclaimer, the term of this patent is extended or adjusted under 35 U.S.C. 154(b) by 2681 days.

(21) Appl. No.: 12/461,384

(22) Filed: Aug. 10, 2009

(65) Prior Publication Data

US 2011/0035589 A1     Feb. 10, 2011

(51) Int. Cl.
 G06F 21/10      (2013.01)

(52) U.S. Cl.
 CPC ...... *G06F 21/10* (2013.01); *G06F 2221/0775* (2013.01)

(58) Field of Classification Search
 USPC ..................................................... 705/50–79
 See application file for complete search history.

(56) References Cited

U.S. PATENT DOCUMENTS

| | | | | |
|---|---|---|---|---|
| 7,697,719 | B2 * | 4/2010 | Rhoads | 382/100 |
| 8,429,516 | B1 * | 4/2013 | Riggs | G06F 21/6254 715/201 |
| 2004/0215708 | A1 * | 10/2004 | Higashi et al. | 709/201 |
| 2005/0246282 | A1 * | 11/2005 | Naslund | H04L 63/0428 705/52 |
| 2006/0075237 | A1 * | 4/2006 | Seo | G06K 9/00523 713/176 |
| 2006/0129490 | A1 * | 6/2006 | Collar | G06F 21/10 705/51 |
| 2007/0250863 | A1 * | 10/2007 | Ferguson | 725/46 |
| 2008/0137848 | A1 * | 6/2008 | Kocher et al. | 380/201 |
| 2011/0197237 | A1 * | 8/2011 | Turner | H04N 21/2343 725/78 |

OTHER PUBLICATIONS

Kim et al., "Boosted Binary Audio Fingerprint Based on Spectral Subband Moments", *Div. of EE Dept. of EECS*, (No date), 4 pages.
Lebosse et al., "A Robust Audio Fingerprint Extraction Algorithm", 6 pages.
Cano et al., A Review of Algorithms for Audio Fingerprinting, 5 pages.
J. Thompson, "Evaluating User Perspectives of Audio Fingerprinting Technologies", *University of NC at Chapel Hill*, Dec. 2008, 34 pages.
Wikipedia [Online—Definition], "Acoustic Fingerprint", printed Mar. 2009, 3 pages.
T. Padilla, Last.fm—the Blog—"Fingerprinting Begins", Dec. 2007, 1 page.

\* cited by examiner

*Primary Examiner* — James M Detweiler
(74) *Attorney, Agent, or Firm* — Nixon & Vanderhye PC

(57) ABSTRACT

A trusted content usage monitor for monitoring content usage is provided. A unique identifier generation unit generates a unique identifier indicative of content being rendered and a packet generator generates a trusted packet comprising the unique identifier. The trusted packet is trust signed by the trusted content usage monitor, so that it can be trusted by its recipient. The trusted content usage monitor has at least one mode of operation in which content rendering cannot be decoupled from operation of the unique identifier generation unit, so that generated packets can be trusted as truly indicative of content usage.

31 Claims, 7 Drawing Sheets

CONTENT USAGE MONITOR

TECHNICAL

The technology relates to content usage monitoring, and more particularly, to trusted content usage monitoring, wherein the results of that content monitoring process can be trusted to be authentic.

BACKGROUND

Widespread contemporary technologies such as personal computers and the internet mean that users may copy, share, and distribute digital content with ease. Whilst this situation can be of great advantage to end users, it also presents great challenges to those who are reliant on content distribution as a source of income, such as recording artists.

In order to address this problem, previously techniques such as Digital Rights Management (DRM) have been developed, which seek to limit an end user's ability to copy and share digital content. Such techniques have however proved to be unpopular, due to their intrusive nature, and in particular because of the limitations they impose on a given end user to copy content legitimately for personal use (for example making a backup copy of an audio CD). Conversely, once DRM protection on a copy of some digital content has been circumvented, that unprotected and unlicensed copy can be distributed at will by those who choose to do so, meaning that over time such unlicensed copies will tend to proliferate at the expense of the protected copies.

Another approach to digital content distribution is to allow end users to freely copy, share and distribute digital content, and to distribute royalty payments to the providers of that digital content in accordance with its usage. Whilst such a scheme is understandably popular with end users, a drawback is that it is open to abuse by those who seek to distort the royalty payment distribution. For example, by repeatedly downloading an item of digital content which is freely available on the internet, a single user may trick the server providing that digital content into registering much higher usage statistics than are fairly to be attributed to that digital content.

One such example of free digital content distribution is the free internet radio service Last.fm (http://www.last.fm/), which allows users to stream audio content as an internet radio or on-demand service. The frequency with which particular audio tracks are listened to by on-line listeners can be used to determine royalty payments to artists and record labels, yet services such as Last.fm are vulnerable to their statistics being distorted by unscrupulous users.

Accordingly, it would be desirable to provide an improved technique for monitoring content usage, which makes it difficult, if not impossible, to unfairly distort the results of that monitoring, and can therefore provide trusted usage information.

SUMMARY

Viewed from a first aspect, a trusted content usage monitor is provided for monitoring content usage comprising: an interface for receiving content; a content renderer; a unique identifier generation unit configured to generate a unique identifier indicative of said content; and a packet generator configured to generate a trusted packet comprising said unique identifier, said trusted packet being trust signed by said trusted content usage monitor, said trusted content usage monitor having at least one mode of operation in which operation of said content renderer cannot be decoupled from operation of said unique identifier generation unit.

Thus, a trusted content usage monitor is provided which receives content via an interface and then renders that content. The trusted content usage monitor has a unique identifier generation unit configured to generate a unique identifier indicative of that content and a packet generator configured to generate a trusted packet comprising the unique identifier. Hence, content usage can be monitored by later examination of the packets generated by the packet generator. This content usage monitoring can be trusted, because the trusted packet is trust signed by the trusted content usage monitor, i.e. the recipient of the packet can trust its content because of the manner in which the packet has been trust signed by the trusted content usage monitor. Furthermore, the recipient of the trusted packet can be confident that the packets generated by the trusted content usage monitor are a true indication of the content that has been rendered, because the trusted content usage monitor has at least one mode of operation in which operation of the content renderer cannot be decoupled from operation of the unique identifier generation unit. In other words, in this mode it is not possible for content to be rendered without the unique identifier generation unit generating a unique identifier indicative of that content. Equally, because the unique identifier generation unit and packet generator are comprised within the trusted content usage monitor, it is not possible for packets indicative of rendered content to be generated, without that content in fact having been rendered.

It should be noted that in the context of the present application, the extent to which the unique identifier is strictly (i.e. mathematically) unique is a choice for the system designer. Ideally the recipient of the trusted packets can be 100% sure of what content has been rendered on the basis of the unique identifier(s) received, but in practice it may prove acceptable for there to be a minor error rate, so long as this does not distort the usage statistics for the purposes they are being gathered.

In one embodiment this mode of operation is the only mode of operation in which the trusted content usage monitor can operate.

Whilst in principle the packet generator could generate the trusted packet as soon as the content renderer begins rendering content, in one embodiment said packet generator is configured to generate said trusted packet only if a predetermined minimum portion of said content has been rendered by said content renderer. In this way, the recipient of the trusted packet can know that a minimum portion of the content has been rendered by the content renderer, thus preventing the impression that the entirety of a piece of content has been rendered, when in fact only a small initial portion of that content has been rendered. As an example, if the content is an audio track, the packet generator can be configured to generate the trusted packet only if (for example) at least 15 seconds of the audio track has been played.

In a related arrangement, in one embodiment the packet generator is configured to generate said trusted packet only if said content has been rendered by said content renderer according to a predetermined manner. Given that the aim of the trusted content usage monitor is to provide content usage monitoring information which can be trusted as indicative of content that has been "truly" rendered, it is advantageous if the trusted packet is only generated if the content has been rendered according to a predetermined manner. It will be appreciated that this predetermined manner could take a variety of forms, but in one embodiment the predetermined manner is a normal rendering speed. In the example of an audio track, this allows the trusted packet only to be generated when the audio track has been played back at normal playing speed, and not merely fast forwarded from beginning to end.

In another approach, to generate trusted packets which the recipient can rely on and from which true content usage can be deduced, in one embodiment said packet generator is configured to generate said trusted packet including an indication of any abnormal rendering. In this arrangement, the packet generator can generate the trusted packet regardless of whether the rendering of that content has taken place normally, but is configured to include in the trusted packet an indication of any abnormal rendering, for example fast forwarding or skipping through an audio track.

It will be appreciated that the unique identifier could be provided in a variety of ways, but in one embodiment, the unique identifier is generated using a hash function. This hash function will be understood by those skilled in the art to be configurable in a number of ways, so long as it provides a unique identifier indicative of the content. In another embodiment the unique identifier is generated using a fingerprinting algorithm. In yet another embodiment the unique identifier comprises a sample of said content.

The trust signing of the trusted packet by the trusted content usage monitor could take place in a number of ways, but in one embodiment the trusted content usage monitor further comprises a signing unit configured to sign said trusted packet using a trusted signing key. Using a trusted signing key provides an advantageously simple yet secure manner of trust signing the trusted packet such that the packet's recipient can be assured of its authenticity.

As well as the unique identifier indicative of the content, the trusted packet may contain various other pieces of information which may be of use to the recipient of the trusted packet for the purposes of content usage monitoring. In one embodiment the trusted packet comprises an indicator associated with said trusted content usage monitor. This enables the recipient of the trusted packet to easily identify the trusted content usage monitor which has generated that trusted packet. In another embodiment said trusted packet comprises a security indicator indicative of a level of trust accorded said trusted content usage monitor. It may be the case that various kinds of trusted content usage monitor exist operating in different situations, which give rise to a different level of trust accorded to each trusted content usage monitor. For example, on the one hand the content usage monitor may be trusted to a high degree, in which case usage statistics derived from such a content usage monitor are taken at face value. On the other hand the content usage monitor may be less well trusted, in which case usage statistics derived from such a content usage monitor may be more closely scrutinised for signs of distortion. As an example of such scrutiny, a sudden spike in the usage of a particular piece of content reported from a less trusted content usage monitor may be ignored as an attempt at spoofing such a sudden increase in usage.

In another embodiment the trusted packet further comprises a time stamp. This not only provides the recipient of the trusted packet with information about when the content was rendered, but also may act as a further security provision in that multiple packets received with identical time stamps are likely to have been spoofed. Alternatively even closely spaced time stamps may be indicative of spoofing if the time stamps are too close to have allowed the indicated content to have been genuinely rendered. In another embodiment the trusted packet further comprises a statistically unique number. For example the content usage monitor may generate a 32-bit random number to append to each trusted packet that is generated, providing a further verification tool for the packet recipient to verify whether two packets from one source do indeed correspond to separate renderings of that content, or are merely a repeated packet.

In another embodiment, the trusted packet further comprises metadata associated with said content. For example such metadata could be ID3 tags in the case of MP3 content. Such metadata may be used to cross check against the identification resulting from the unique identifier produced by the unique identifier generation unit, or even to identify the content in the case that the unique identifier cannot be recognized by the recipient of the trusted packet.

In another embodiment the trusted packet further comprises an indication of configuration details of the trusted content usage monitor. This enables the recipient of the trusted packet to gather information regarding the trusted content usage monitor. In another embodiment the trusted packet further comprises an indication of configuration details of a system comprising said trusted content usage monitor. This enables the recipient of the trusted packet to gather information regarding a system, such as a mobile phone, or personal computer of which the trusted content usage monitor forms part.

An advantage of the technology in this application is that if the packet is trust signed and can therefore be trusted by its recipient, there is in principle no need for third parties to be prevented from reading the contents of the trusted packet, so long as those third parties are unable to fake these trusted packets. However, in one embodiment, the trusted content usage monitor further comprises an encryption unit configured to encrypt said trusted packet using an encryption key. This provides a further level of security for the system, preventing third parties from being able to read the contents of the trusted packets and for example preventing transmission of particular packets in order to distort the usage statistics.

Once the packets have been generated they may be handled in a number of different ways. In one embodiment the trusted content usage monitor is configured to transmit said trusted packet. For example, if the monitoring of content usage were being carried out in a mobile phone, that mobile phone could transmit the trusted packet via its normal communication channels to a remote server. In one embodiment the trusted content usage monitor is configured to store said trusted packet prior to transmission. This may be advantageous for a number of reasons, for example to transmit only when it is desirable to do so, e.g. so as not to conflict with other communication requirements, or to store multiple packets to transmit later in a burst. Transmitting packets in a burst may be useful to conserve battery life in a mobile device, for example simply due to the efficiency of a batch burst, or alternatively by waiting until the mobile device has a high bandwidth transmission channel available to it (e.g. in a WiFi connected location).

In another embodiment the trusted content usage monitor is configured to store said unique identifier prior to generating said trusted packet. This allows the trusted content usage monitor to separate the generation of the unique identifier from the generation of the trusted packet, for example so that multiple unique identifiers can be bundled into one trusted packet.

The interface over which the trusted content usage monitor receives the content may connect to a number of different types of source. In one embodiment the interface is configured to receive said content from a non-trusted source. This reduces the extent of the components which are required to be trusted effectively resulting in a more secure system. The source of the content does not need to be trusted, as long as the trusted content usage monitor itself is trusted.

It will be appreciated that the particular type of content, the usage of which is being monitored by the trusted content usage monitor, could take a variety of forms. In one embodiment said content renderer is an audio renderer and said content comprises audio data. In another embodiment said content renderer is a video renderer and said content comprises video data. In another embodiment said content renderer is a text renderer and said content comprises text data. In another embodiment said content renderer is a graphics renderer and said content comprises graphics data. In another embodiment said content renderer is an application execution device and said content comprises application data. Application data could take a variety of forms, in particular software that is arranged to be executed on a system incorporating the trusted usage monitor. Hence rendering content, when understood in the context of application data, could for example consist of executing that application on the system, or alternatively could only consist of installing that application on the system.

Whilst the unique identifier indicative of the content could be generated by continuous sampling of the content as it is rendered, in one embodiment said unique identifier generation unit is configured to generate said unique identifier indicative of said content by intermittently sampling said content during rendering by said content renderer. This intermittent sampling, in one embodiment, occurs at predetermined intervals during said rendering. In another embodiment the intermittent sampling occurs at randomized intervals during said rendering.

Viewed from a second aspect, a method of operating a trusted content usage monitor is provided to monitor content usage, comprising the steps of: receiving said content; generating a unique identifier indicative of said content; and generating a trusted packet comprising said unique identifier, said trusted packet being trust signed by said trusted content usage monitor, said trusted content usage monitor having at least one mode of operation in which rendering said content cannot be decoupled from generating said identifier.

Viewed from a third aspect, a trusted content usage monitor is provided for monitoring content usage comprising: interface means for receiving content; content rendering means for rendering content; unique identifier generation means for generating a unique identifier indicative of said content; and packet generator means for generating a trusted packet comprising said unique identifier, said trusted packet being trust signed by said trusted content usage monitor, said trusted content usage monitor having at least one mode of operation in which operation of said content rendering means cannot be decoupled from operation of said unique identifier generation means.

Viewed from a fourth aspect, a data processing system is provided comprising a trusted content usage monitor according to the first aspect. In such a system, the trusted content usage monitor may be viewed as a trusted component of that system, whilst other components may be non-trusted. Such components may be distinct items of hardware, or may be implemented in software running in either a trusted or a non-trusted environment. As such it is possible for some trusted components and some non-trusted components to be implemented by the same hardware, such as a processor core, if for example that processor core is arranged to execute both trusted and non-trusted software. In one embodiment the interface over which the trusted content usage monitor receives content is configured to receive that content from a non-trusted component of the system.

DESCRIPTION OF EXAMPLE EMBODIMENTS

Figure 1:
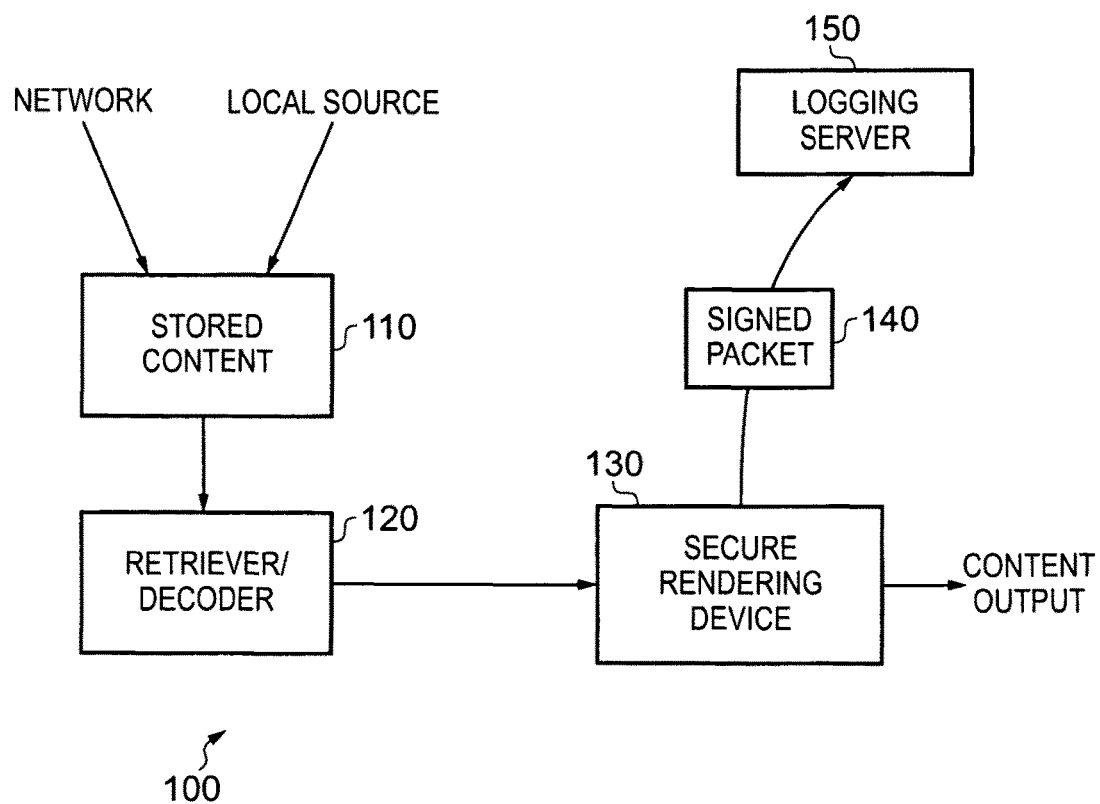
FIG. 1 schematically illustrates a system comprising a trusted content usage monitor of one embodiment in the form of a secure rendering device.

FIG. 1 schematically illustrates a system comprising a trusted content usage monitor according to one embodiment. In the context of the present discussion, a content usage monitor is described as "trusted" if the content usage results that it produces can be relied upon as genuine, i.e. truly indicative of the content that has been used. This "trust" could be ensured in various ways, one example of this being the provision of secure components within a system to which non-secure components of the system have no access. Security is further discussed below.

The system 100 comprises a content store 110 into which content may be stored either by downloading it from a network or from a local source (such as from a CD, a DVD or a USB stick). Content is then retrieved and if necessary decoded by retriever/decoder 120, which then passes the (decoded) content to secure rendering device 130. Secure (i.e. trusted) rendering device 130 comprises a trusted content usage monitor for monitoring the content used (i.e. rendered) by secure rendering device 130. Secure rendering device 130 then produces content output. The particular content and the corresponding nature of the secure rendering device could take a range of forms such as: audio content rendered by an audio device (e.g. music played back by audio hardware); video content rendered by an video device (e.g. video played back by video hardware); text content rendered by an text device (e.g. an e-book displayed on a screen); graphics content rendered by a graphics device (e.g. graphics reproduced on a screen); or application content rendered by an application rendering device (e.g. application software executed on a computer).

In parallel to rendering the content the trusted content usage monitor in secure rendering device 130 generates trusted packets which are signed as being authentic. These signed packets 140 are transmitted to logging server 150 which gathers usage statistics for the content being used. The security provisions enabling secure rendering device 130 to be deemed "secure" may be provided in a number of ways, but in the embodiments described herein the security is provided by the TrustZone technology provided by ARM Limited of Cambridge, United Kingdom as described for example in U.S. patent application Ser. No. 10/714,518, now U.S. Pat. No. 7,849,310 the contents of which are incorporated herein by reference. There are also various standards known to the skilled person for defining how trusted signing and encryption could be implemented, such as Public-Key Cryptography Standard (PKCS) #7 (see http://www.rsa.com/rsalabs/node.asp?id=2129), and how cryptographic data should be handled within a secure environment, such as PKCS #11 (see http://www.rsa.com/rsalabs/node.asp?id=2133). Equally the implementation of secured key and data transfers could be managed by well known protocols such as Transport Layer Security (TLS)—see RFC 5246:: "The Transport Layer Security (TLS) Protocol Version 1.2" (see http://tools.ietf.org/html/rfc5246).

Figure 2:
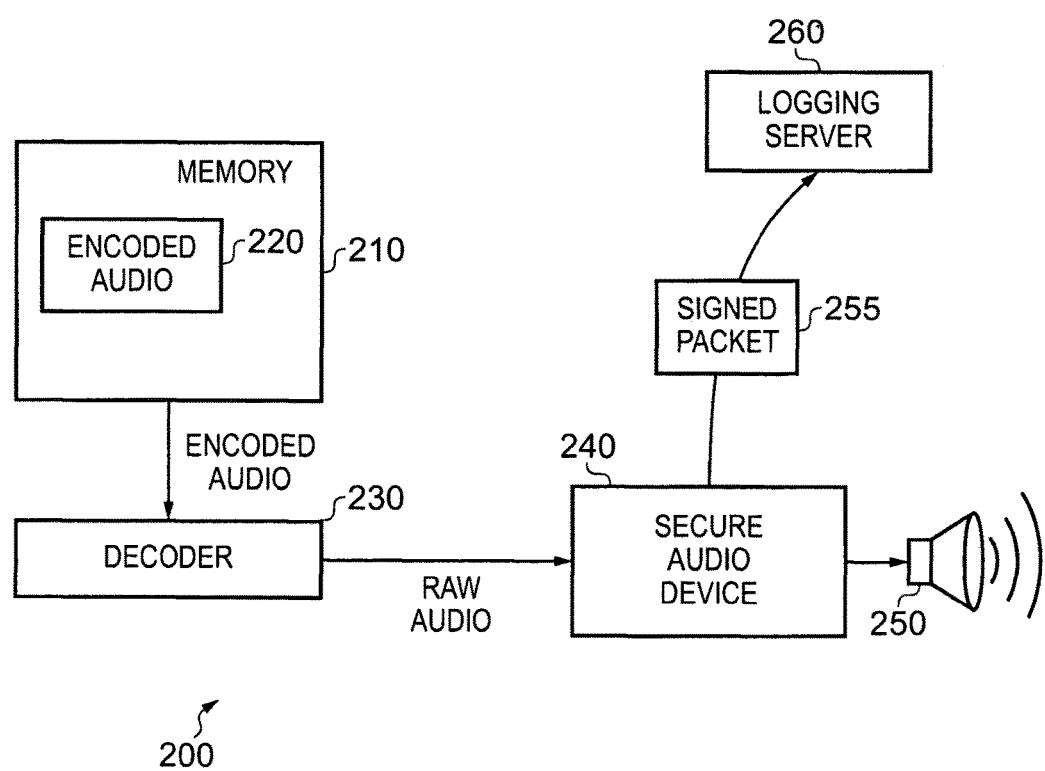
FIG. 2 schematically illustrates a system comprising a trusted audio content usage monitor of one embodiment.
Figure 3:
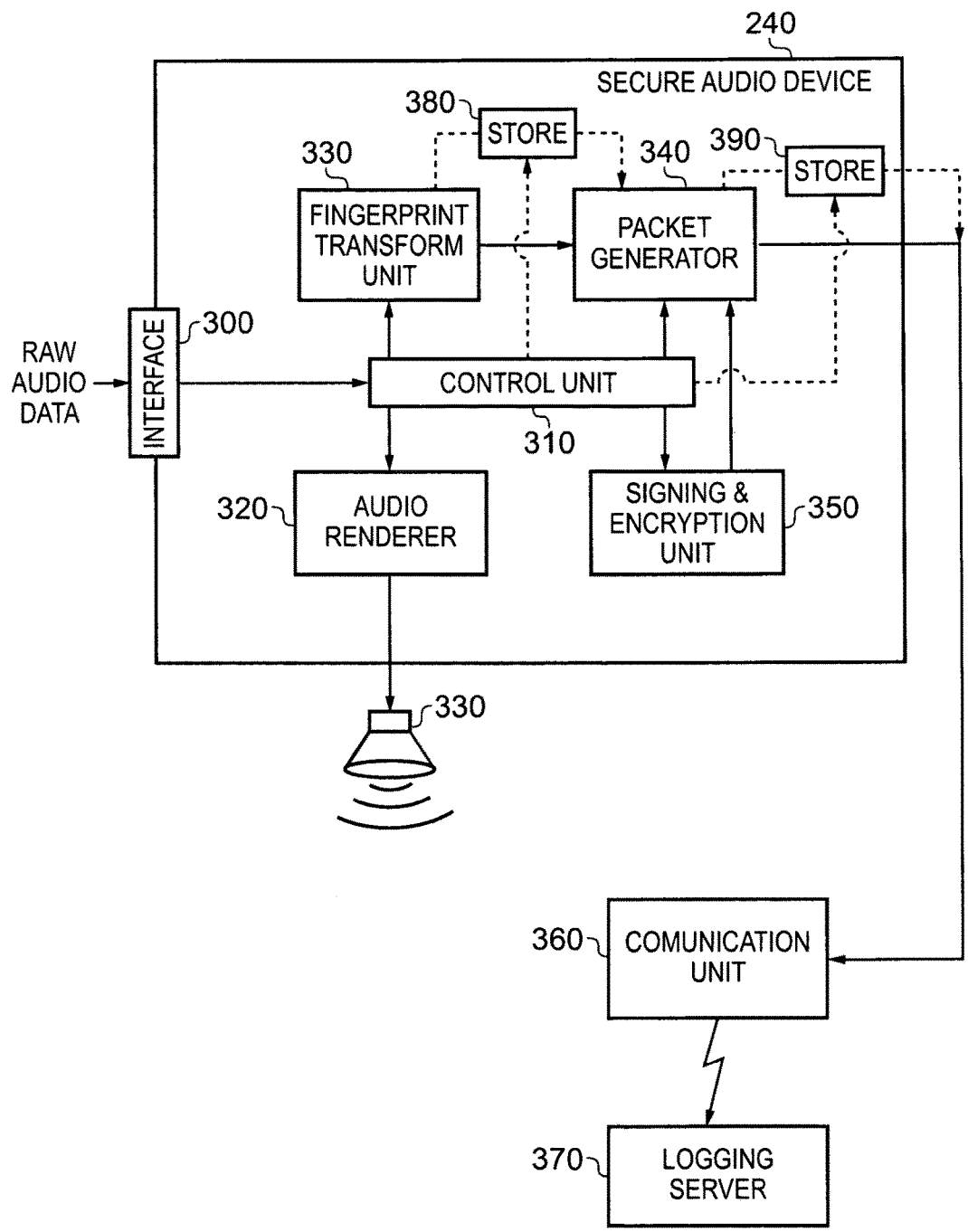
FIG. 3 schematically illustrates in more detail the trusted audio content usage monitor of FIG. 2 in accordance with one embodiment.
Figure 5:
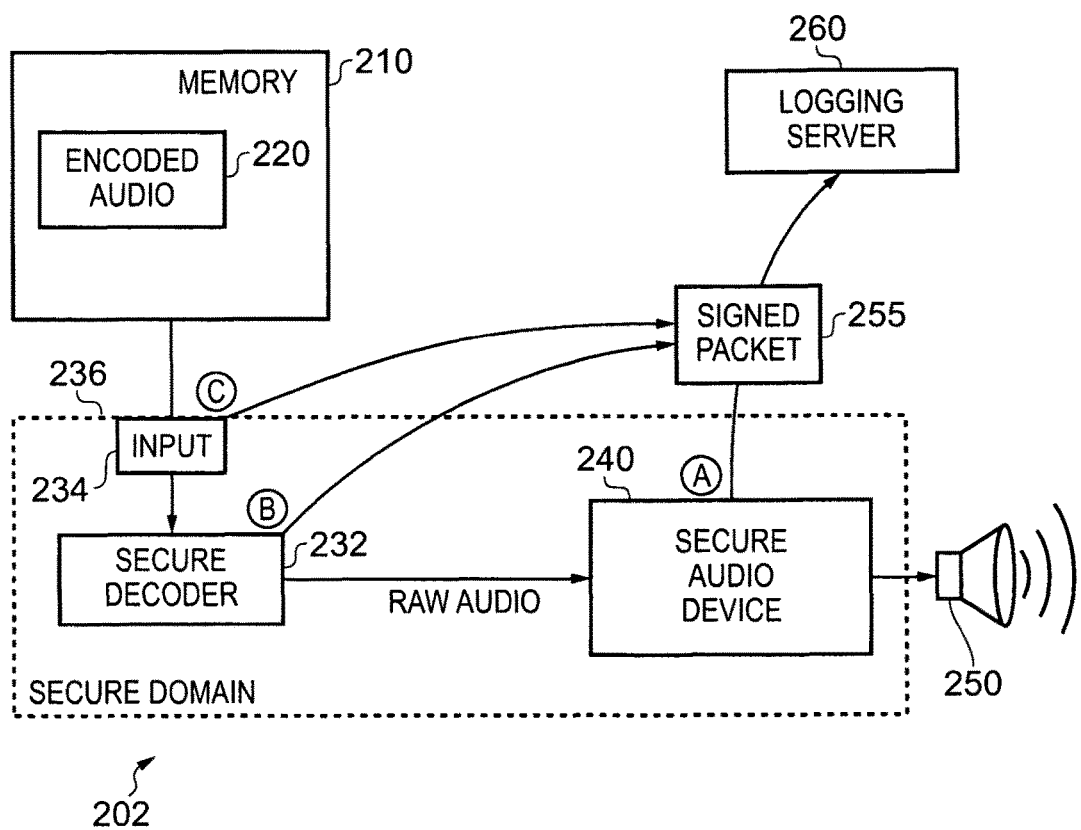
FIG. 5 schematically illustrates a system comprising a trusted audio content usage monitor of one embodiment.
Figure 6:
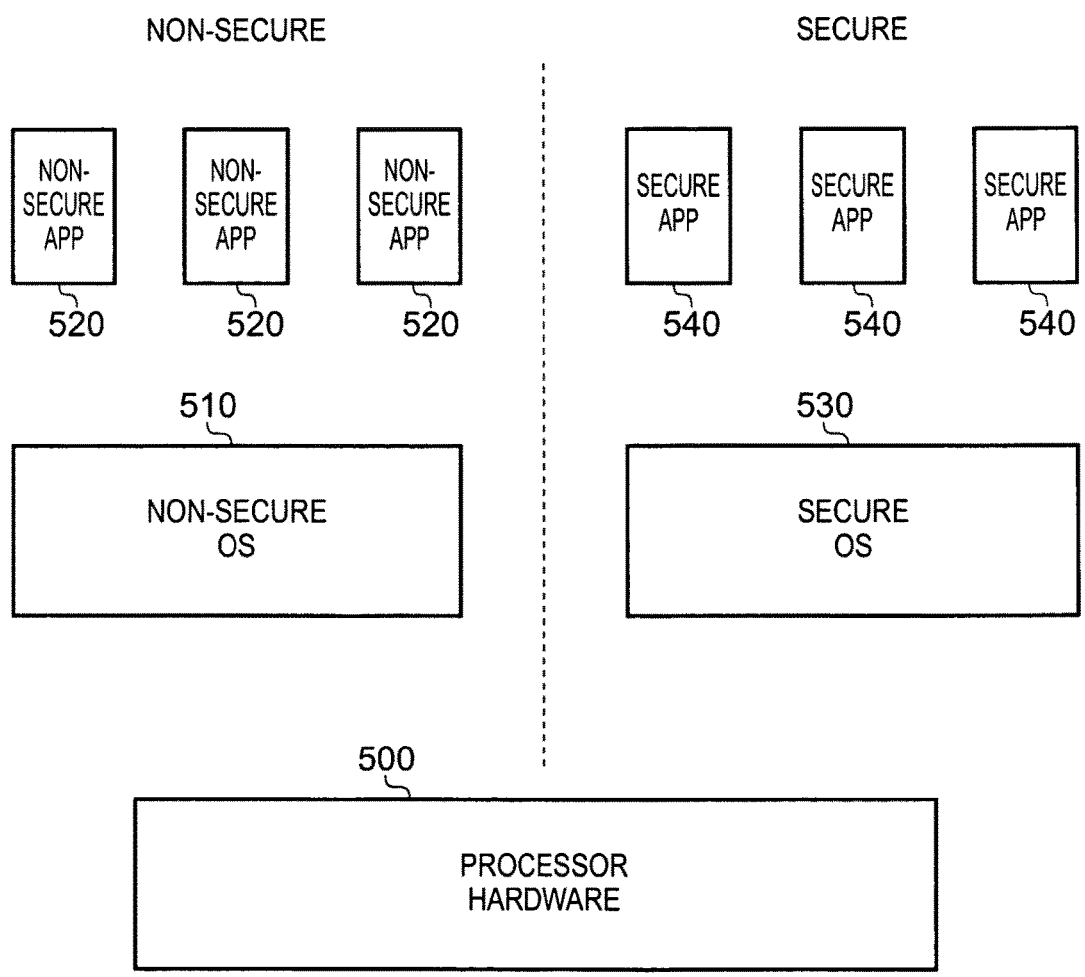
FIG. 6 schematically illustrates the division of a system into secure and non-secure domains.
Figure 7:
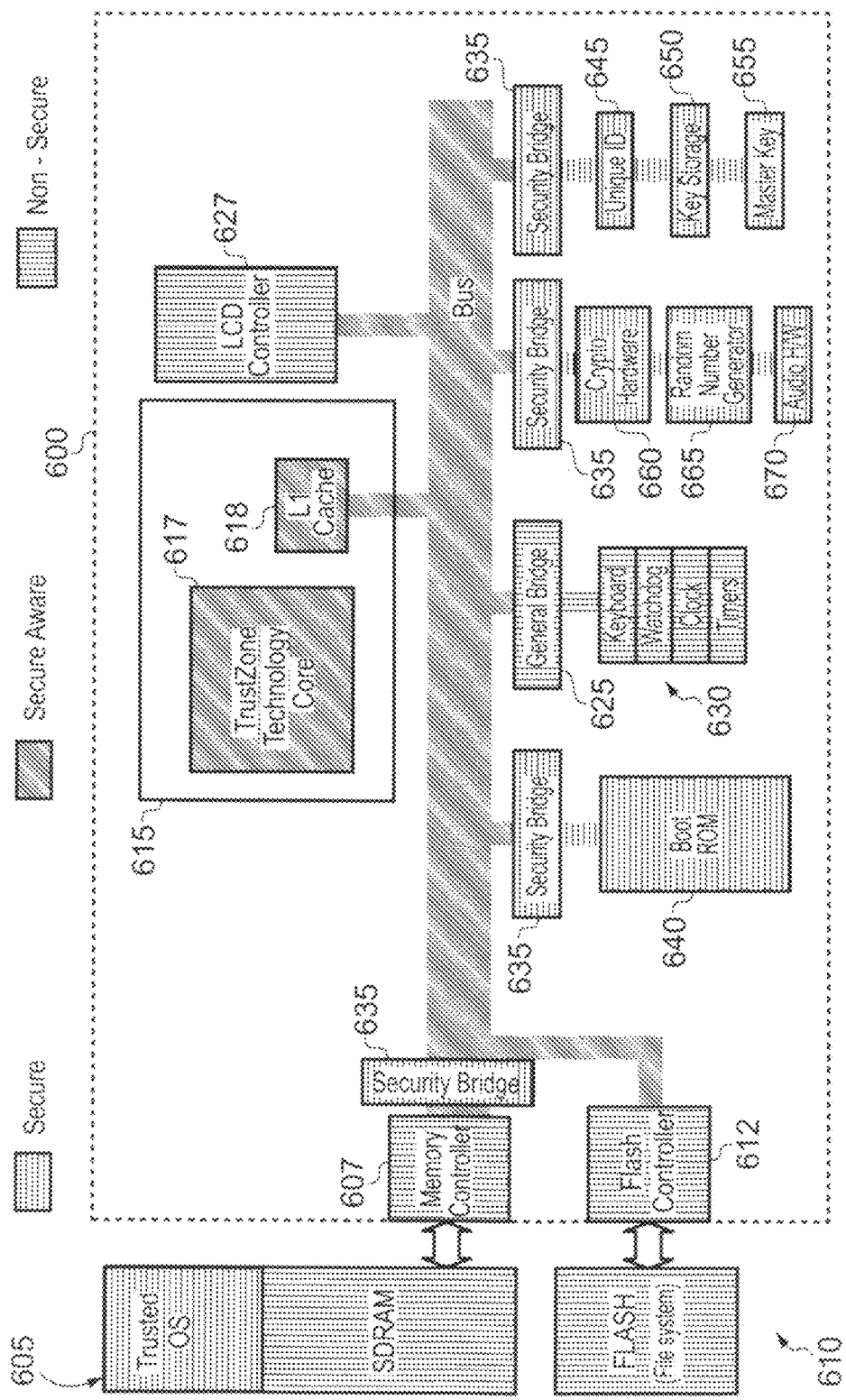
FIG. 7 schematically illustrates a system which implements a trusted content usage monitor according to one embodiment.

Additionally it should be noted that the illustrated "devices" in FIG. 1 may be embodied as dedicated hardware components, but may alternatively be embodied as software components running on a suitable system. In the following, as examples of these possibilities, the embodiments shown in FIGS. 2, 3 and 5 are described as hardware devices, whilst the embodiments shown in FIGS. 6 and 7 are described in terms of software. Equally, in any given embodiment a mix of hardware and software is of course also possible.

FIG. 2 schematically illustrates a specific example of the system illustrated in FIG. 1, namely an audio rendering system 200. The system 200 comprises memory 210 in which encoded audio 220 is stored. Encoded audio 220 is, in this embodiment, encoded in MP3 format. When the user of system 200 wishes to play an item of audio content, that item is passed from memory 210 to audio decoder 230 which converts the encoded audio into raw audio which in this embodiment is in Pulse-Width Modulation (PWM) format. This raw audio is then passed to secure audio device 240 which drives loudspeaker 250, thus playing the required audio track. In parallel to driving loudspeaker 250, the secure audio device 240 also generates and signs signed packet 255 which contains a unique identifier indicative of the audio track being played and transmits this signed packet 255 to logging server 260.

FIG. 3 schematically illustrates in more detail the secure audio device 240 shown in FIG. 2. The raw audio data is received by secure audio device 240 over interface 300 which passes the raw audio data to control unit 310. Control unit 310 passes the raw audio data to audio renderer 320 which drives loudspeaker 330 to produce the audio output. Thus, audio renderer 320 is essentially an analogue-to-digital converter. In parallel, control unit 310 passes the raw audio data to fingerprint transform unit 330. Fingerprint transform unit 330 analyses the stream of raw audio data and generates a unique identifier indicative of the content of the raw audio data. Although the fingerprint transform unit could in principle generate a true fingerprint (in the mathematical sense of the word, where a large data item is mapped to a much shorter bit string), such algorithms are sensitive to the encoding used for the content or any distortion, since any minor change at the bit level will result in a change to the fingerprint thus produced. Preferably instead the fingerprint is indicative of the perceptual characteristics of the audio content. The skilled person will be aware of various techniques for performing a fingerprint in this manner which exploit perceptual characteristics of the audio content such as tempo, spectral features and prominent tones. Contemporary audio fingerprinting algorithms are able to identify whole audio tracks from excerpts only a few seconds long. Example techniques are described in "A Robust Audio Fingerprint Extraction Algorithm", J. Lebossé, L. Brun, J-L. Starck, J. C. Pailles, SPPRA2006, pp. 185-192, Innsbruck, Austria, February 2006 and "Boosted Binary Audio Fingerprint Based On Spectral Subband Moments", Sungwoong Kim and Chang D. Yoo, ICASSP2007), Honolulu, Hawai'i, April 2007.

The "fingerprint" develops as the raw audio data is fed to the fingerprint transform unit 330 requiring a minimum amount of time for the fingerprint to have developed sufficient characteristics to uniquely identify the audio content. The control unit 310 is arranged in one embodiment to control fingerprint transform unit 330 to pass the results of its operation to packet generator 340 once a predetermined period of time has passed. Similarly the control unit 310 is configured to prevent packet generator 340 from generating a packet until a minimum proportion of the audio content is played back. In another embodiment the control unit 310 is configured to control fingerprint transform unit 330 to intermittently sample the audio content during playback. This intermittent sampling can be configured to occur at predetermined intervals during said playback or at randomized (quasi-random) intervals during playback.

Packet generator 340 is arranged to generate a packet comprising the unique identifier (fingerprint) provided by fingerprint transform unit 330 in order to pass this information to the outside world. Before being released to the outside world the packet is trust signed and encrypted, these stages being performed by signing and encryption unit 350 which is also controlled by control unit 310. Finally the packet generator 340 passes the trust signed and encrypted packet to communication unit 360 which, in this embodiment, is outside the secure audio device 240 (but in other embodiments could comprise part of secure audio device 240). Communication unit 360 then transmits the packet to logging server 370. In the embodiment illustrated in FIG. 3, control unit 310 is arranged to ensure that audio renderer 320 can only be operated in parallel to operation of the fingerprint transform unit 330 and packet generator 340, such that audio cannot be produced from loudspeaker 330 under control of secure audio device 240 without a corresponding fingerprint and packet being generated. Conversely a fingerprint and packet cannot be generated without operation of the audio renderer 320. Logging server 370 is arranged to gather usage statistics, the usage statistics being gathered from many different trusted content monitors. The usage statistics are then later analysed in order to determine the relative usage frequency of the audio content.

In one alternative embodiment, the fingerprint transform unit 330 is arranged to perform a selection on the raw audio data it is passed from control unit 310, and to pass this sample to the packet generator 340. The identification of that sample is then performed by the recipient of the trusted packet.

In an alternative embodiment, the control unit could be arranged to allow, under certain specific circumstances, the audio renderer 320 to operate independently of the fingerprint transform unit 330 and packet generator 340, such that audio can (under these specific circumstances) be produced from loudspeaker 330 without a corresponding fingerprint and packet being generated. This could for example allow the user to operate the system occasionally without packets indicative of content usage being generated. However, although a user may have valid privacy reasons for occasionally opting out of the trusted packet generation process, an inherent advantage of participating in the trusted packet generation process is that by doing so the user will be benefiting the content producers that they favour. As such there is a constant incentive for users who have such a possibility to opt out to choose to opt in.

In alternative embodiments the secure audio device 240 further comprises temporary storage unit 380 and/or temporary storage unit 390. Temporary storage unit 380 is arranged to store (under the control of control unit 310) fingerprints produced by fingerprint transform unit 330 before being passed to packet generator 340. Similarly temporary storage unit 390 is arranged to store (under the control of control unit 310) packets produced by packet generator 340 before being passed to communication unit 360. Accordingly multiple fingerprints stored in temporary storage unit 380 can be bundled into one packet and/or multiple packets stored in temporary storage unit 390 can be transmitted together.

Figure 4:
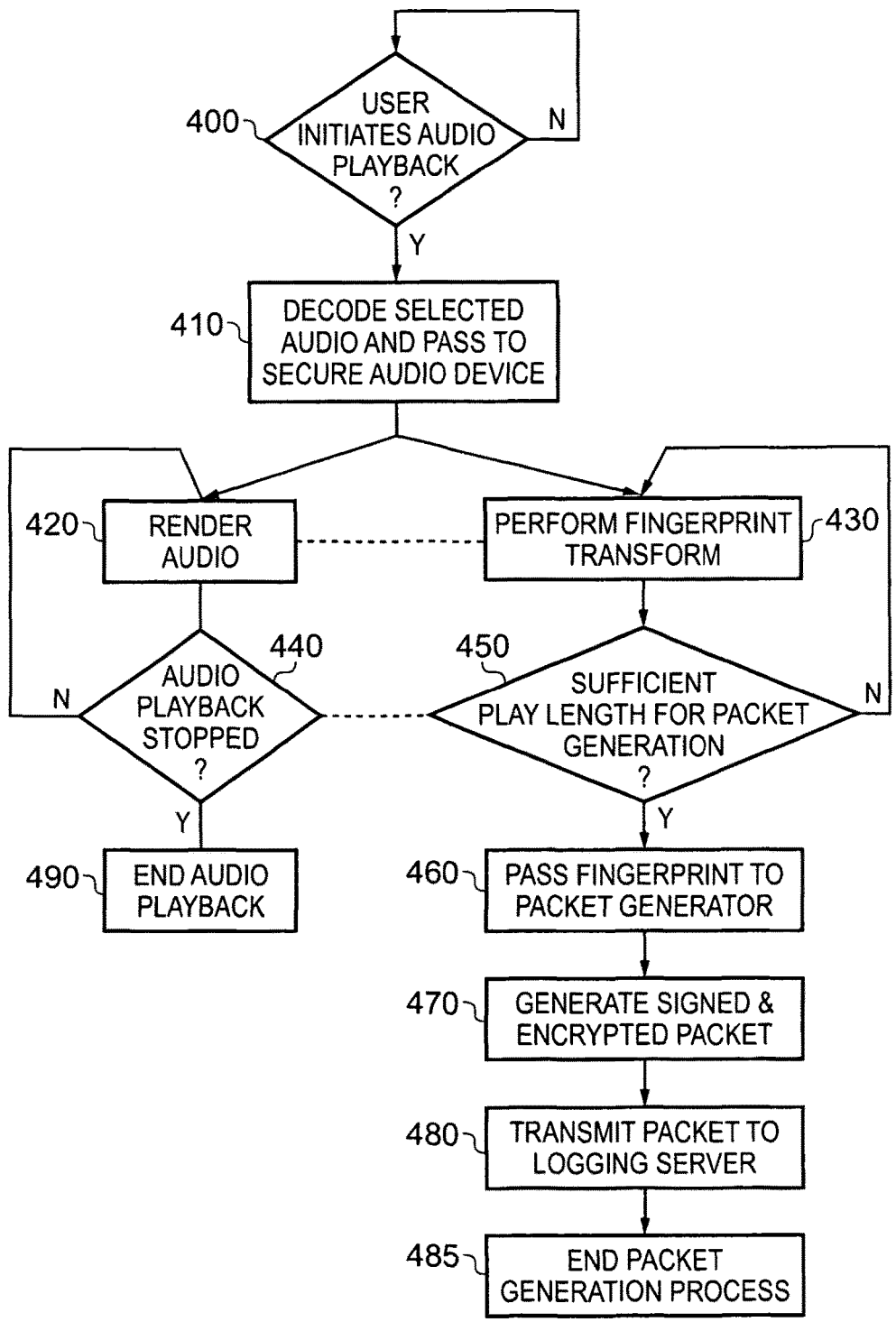
FIG. 4 illustrates a series of steps taken by a trusted audio content usage monitor such as that illustrated in FIG. 3 in accordance with one embodiment.

FIG. 4 schematically illustrates a series of steps taken when secure audio device 240 is operating in a system such as that illustrated in FIG. 2. At step 400 it is determined if the user has initiated audio playback. Until the user initiates audio playback the flow loops on itself through step 400. When the user initiates audio playback the flow proceeds to step 410 where the selected audio is decoded and passed as raw audio to the secure audio device. The flow then splits into two parallel streams, the rendering of the audio taking place in step 420 and the fingerprint transform being performed in step 430. The parallel nature of these operations is illustrated by the dashed line connecting steps 420 and 430. At step 440 it is determined if audio playback has stopped. If it has not, the flow returns to step 420 (and in parallel to step 430) and the rendering of audio and fingerprint transform continues. In parallel to step 440 (indicated by the dashed line between steps 440 and 450), at step 450 it is checked whether there has been sufficient play length to allow packet generation to occur. If there has thus far been insufficient audio playback to allow packet generation then the flow returns to step 430 (and in parallel step 420) and the fingerprint transformation process and audio rendering continue.

As soon as sufficient play length has occurred for packet generation to take place, then at step 450 the flow proceeds to step 460, where the fingerprint is passed to the packet generator 340. At step 470 the packet generator 340 and signing and encryption unit 350 generate the signed and encrypted packet which at step 480 is then transmitted to the logging server. The packet generation process thus ends at step 485. Note that this then decouples the audio playback loop (steps 420 and 440) from the fingerprinting loop (steps 430 and 450), i.e. audio playback then continues until it is stopped, without further fingerprinting (or packet generation) occurring.

Finally, if at step 440 audio playback is stopped, then the flow proceeds to step 490 where the process ends. It should be understood that steps 460, 470 and 480 effectively follow immediately from the determination at step 450 that sufficient play length has occurred for packet generation to take place. Hence the stopping of audio playback at step 440 will only prevent packet generation from occurring if it occurs earlier than a positive determination at step 450.

FIG. 5 schematically illustrates another example of the system illustrated in FIG. 1, as an alternative to that illustrated in FIG. 2. This audio rendering system 200 is similar to the system 200 illustrated in FIG. 2, with memory 210, encoded audio 220, loudspeaker 250, signed packet 255 and logging server 260 being identical. However in the embodiment illustrated in FIG. 5, decoder 232 is also a secure device such that together secure decoder 232 and secure audio device 240 can be considered to form a "secure domain" 236 of the system. Furthermore, system 202 illustrates three alternative arrangements for the point within the secure domain of the system at which the fingerprinting and packet generation can take place.

Alternative A is the same as is illustrated in FIG. 2, the fingerprinting process being applied to the raw audio received by audio device 240.

In alternative B the fingerprinting process is integrated into the decoding process performed by secure decoder 232. For example, in this audio example, the fingerprinting can be arranged to operate on frequency samples prior to the inverse Modified Discrete Cosine Transform (iMDCT) in the decode process. In an equivalent video based example, where the decoder is a graphics driver, this fingerprinting could take place with respect to triangle lists (e.g. in an OpenGL-ES 3D graphics driver).

In alternative C the fingerprinting process takes place at the input (shown as input unit 234) to the secure domain 236 on the incoming encoded audio (e.g. MP3 stream) being transferred from memory 210.

The security required in a system implementing the technology described here could be provided in a number of different ways. However, in one embodiment it is provided by employing the TrustZone technology provided by ARM Limited of Cambridge, United Kingdom. According to the TrustZone technology, components of a system are defined as being in the "secure" domain (i.e. trusted) or the "non-secure" domain (i.e. non-trusted). It is also possible for components to be "secure aware", meaning that they have the ability to operate in either domain and to act appropriately for that domain. One example of such a secure aware device is the processor hardware, which is schematically illustrated in FIG. 6. FIG. 6 schematically illustrates a software view of the processor hardware 500, spanning the secure domain and the non-secure domain. In the non-secure domain the processor hardware has a non-secure operating system 510, under which various applications 520 are run. Similarly in the secure domain the processor hardware has a secure operating system 530, under which various applications 540 are run.

Hence, when such a system is implementing the technology described in this application, trusted components such as the secure audio device 240 illustrated in FIG. 2 are thus implemented in the right hand side of this figure in the secure domain. For example the control unit 310, the fingerprint transform unit 330, the packet generator 340, the signing and encryption unit 350 and at least the driver software for the audio renderer 320 will be implemented as secure applications 540 running under control of the secure OS 530. Conversely non-trusted components such as the decoder 230 are implemented in the left hand side of this figure in the non-secure domain as non-secure application 520 running under control of the non-secure OS 510.

FIG. 7 schematically illustrates in more detail a system comprising a trusted content usage monitor according to one embodiment of the present invention. The system is composed of some components that are secure (i.e. trusted) (labelled with vertical hatching), some components that are non-secure (i.e. non-trusted) (labelled with horizontal hatching) and some components that are secure aware, meaning that they have be ability to operate in either a secure or a non-secure mode (labelled with diagonal hatching).

The system generally comprises a system-on-chip (SOC) 600, external SDRAM 605 (accessed via memory controller 607) and external FLASH 610 (accessed via flash controller 612). On-chip there is a processor comprising a TrustZone technology enabled core 617 and an L1 cache 618. Processor core 617 communicates with the remainder of the system via bus 620. Connected to the bus is LCD controller 627, which provides display control for communicating information to the user. Some general purpose components which are part of the non-secure (non-trusted) domain are connected to the bus 620 via a general bridge 625, such as a keyboard, watchdog unit, clock and timers (generally indicated as 630). Other components, which form part of the secure (trusted) domain are connected to the bus 620 via security bridges 635. These security bridges 635 in effect render the secure parts of the system invisible to non-secure parts of the system. One security bridge 635 provides access to boot ROM 640 which stores trusted boot code for the system. Another security bridge 635 provides access to unique ID storage unit 645, key storage unit 650 and master key storage unit 655. Another security bridge 635 provides access to crypto hardware 660, random number generator unit 665 and audio hardware 670. Another security bridge 635 provides access (via memory controller 607) to the secure part of SDRAM 605 in which the trusted OS is stored. A non-trusted OS is also stored in the non-secure part of SDRAM 605.

In operation, when a user wishes to play an audio track he starts any audio player available in the non-trusted OS (i.e. in non-secure memory in SDRAM 605). The audio player offers a selection of encoded tracks stored in the flash file system 610 in the non-trusted OS (e.g. via a display interface controlled via LCD controller 627). In this example the tracks are encoded in MP3 format. The user selects a track for playback, e.g. by means of input via keyboard 630 (corresponding to step 400 in FIG. 4).

The non-trusted audio player (typically with support of non-trusted CODECS in the non-trusted OS) decodes segments of the track into a raw audio format such as pulse-width modulation (corresponding to step 410 in FIG. 4). The player then (via non-trusted audio drivers in the non-trusted OS) places all or parts of that track into an audio buffer in non-secure memory in SDRAM 605. The player then (via non-trusted audio drivers in the non-trusted OS) messages a trusted track ID application in the trusted OS in SDRAM 605 that a first segment is ready for playback. Note that in this system non-trusted audio drivers have no direct capability to render audio. They can only do so by communicating with the trusted track ID application.

The trusted track ID application initialises the trusted track ID generator and points it at the first segment for fingerprinting. The trusted track ID application initialises the trusted audio driver and points it at the first segment for playback. Simultaneously the trusted track ID application instigates two actions:

A. Firstly, if the trusted track ID generator has not completed a reference segment, the trusted track ID generator uses the presented raw audio to continue building its unique track identifier (i.e. a fingerprint) (corresponding to step 430 in FIG. 4). It may use the cryptographic hash generators typically built into the cryptographic hardware 660 (e.g. SHA1, MD5 etc) to perform this step, or it may make use of dedicated algorithms for processing audio media.

B. Secondly, the trusted audio hardware/driver combination proceeds with playback (corresponding to step 420 in FIG. 4) taking control commands from the non-trusted player via the non-trusted audio drivers. The trusted audio driver is the only thing that can access the audio hardware 670. Any commands (routed via the trusted track ID application) from the non-trusted audio player which cause playback to be unintelligible are acted upon, but also noted for later reference as exceptions to intelligible playback (e.g. mute, fast forward, rewind). When the trusted audio driver is ready for the next segment it informs the trusted track ID application.

Unless interrupted (corresponding to step 490 in FIG. 4), the trusted track ID application requests further data from the non-trusted audio driver and if there is further data then the process continues repeating actions A and B above.

Once a sufficient reference segment of the raw audio has been used to generate a trusted track ID (corresponding to step 450 in FIG. 4), and all other relevant data has been gathered, then the trusted track ID application instigates the trusted track ID packet finalisation procedure (corresponding to step 460 in FIG. 4), according to which a data packet is created containing:

the trusted track ID (i.e. the audio fingerprint);
notes on the number and nature of exceptions to intelligible playback;
device specific information retrieved from the secure store (a file system enabled by the secure world's internal use of keys and device unique identities along with the cryptographic hardware, providing cryptographically sealed or signed security of data that is stored in the general file system);
a device unique identifier derived directly or indirectly from secure device identification;
user specific information retrieved from the secure store;
a statistically unique value generated by the trusted random number generator 665, used to prevent replay attacks (the repeated sending of an intercepted packet); and
a secure timestamp (if available—although the generation of trusted clocks is complicated and so the system may rely purely on the statistically unique value).

The crypto hardware 660 signs the packet against a key (stored in key storage 650) that the packet receiver (i.e. the logging server) trusts (corresponding to step 470 in FIG. 4). Note that the key itself does not need to be exposed to risk as it is referenced by an identifier even inside the secure environment and the signing calculations are carried out inside the cryptographic hardware. The trusted track ID application passes the data packet to the non-trusted OS. The non-trusted OS uses its non-trusted communications methods to transmit the packet to the server (corresponding to step 480 in FIG. 4). Because the packet has been protected by security measures while inside the secure environment it is now safe from attacks and the receiving logging server may itself trust the packet of data received. Other variants of this exist depending on what data and playback information is needed to be noted.

Thus a trusted content usage monitor is provided which generates packets from which the content usage can be derived. The content used is indicated by means of a unique identifier generated within the trusted content usage monitor. The recipient of the packets can be confident of their authenticity, because the packets are trust signed by the trusted content usage monitor in a fashion that is trusted by the recipient. Furthermore, the recipient of the trusted packet can be confident that the packets generated by the trusted content usage monitor are a true indication of the content that has been used, because the trusted content usage monitor has at least one mode of operation in which operation of the content renderer cannot be decoupled from operation of the unique identifier generation unit. In other words, in this mode it is not possible for content to be rendered without the unique identifier generation unit generating a unique identifier indicative of that content. Conversely it is not possible for a unique identifier (and hence a packet incorporating such a unique identifier) to be generated without that content having been rendered.

Although particular embodiments have been described herein, it will be apparent that the claims are not limited thereto, and that many modifications and additions may be made within the scope of the claims.

We claim:

1. A trusted content usage monitoring system for monitoring content usage comprising:
    an interface for receiving content;
    a content rendering device;
    a processor system including at least one processor, said processor system being configured to:
    generate a unique identifier indicative of said content; and
    generate a trusted packet comprising said unique identifier, said trusted packet being signed using a trusted key by said trusted content usage monitoring system,
    said trusted content usage monitoring system having at least one mode of operation in which operation of said content rendering device cannot be decoupled from execution of said unique identifier generation by said processor system,
    wherein said processor system is configured to generate said trusted packet only if a predetermined minimum portion of said content has been rendered by said content rendering device.

2. A trusted content usage monitoring system as claimed in claim 1, wherein said processor system is configured to generate said trusted packet only if said content has been rendered by said content rendering device according to a predetermined manner.

3. A trusted content usage monitoring system as claimed in claim 2, wherein said predetermined manner is a predetermined speed at which the content is intended to be rendered for consumption.

4. A trusted content usage monitoring system as claimed in claim 1, wherein said processor system is configured to generate said trusted packet including an indication of any abnormal rendering, wherein said abnormal rendering comprises fast forwarding of said content.

5. A trusted content usage monitoring system as claimed in claim 1, wherein said unique identifier is generated using a hash function and said hash function hashes said content.

6. A trusted content usage monitoring system as claimed in claim 1, wherein said unique identifier is generated using a fingerprinting algorithm.

7. A trusted content usage monitoring system as claimed in claim 1, wherein said unique identifier comprises a sample of said content.

8. A trusted content usage monitoring system as claimed in claim 1, wherein said trusted packet comprises an indicator to identify said trusted content usage monitoring system.

9. A trusted content usage monitoring system as claimed in claim 1, wherein said trusted packet comprises a security indicator indicative of a level of trust accorded to said trusted content usage monitoring system.

10. A trusted content usage monitoring system as claimed in claim 1, wherein said trusted packet further comprises a time stamp.

11. A trusted content usage monitoring system as claimed in claim 1, wherein said trusted packet further comprises metadata associated with said content.

12. A trusted content usage monitoring system as claimed in claim 1, wherein said trusted packet further comprises an indication of configuration details of the trusted content usage monitoring system.

13. A trusted content usage monitoring system as claimed in claim 1, wherein said trusted packet further comprises an indication of configuration details of a system comprising said trusted content usage monitoring system.

14. A trusted content usage monitoring system as claimed in claim 1, wherein said processor system is further configured to encrypt said trusted packet using an encryption key.

15. A trusted content usage monitoring system as claimed in claim 1, wherein said trusted content usage monitoring system is configured to transmit said trusted packet.

16. A trusted content usage monitoring system as claimed in claim 15, wherein said trusted content usage monitoring system is configured to store said trusted packet prior to transmission.

17. A trusted content usage monitoring system as claimed in claim 1, wherein said trusted content usage monitoring system is configured to store said unique identifier prior to generating said trusted packet.

18. A trusted content usage monitoring system as claimed in claim 1, wherein said interface is configured to receive said content from a non-trusted source.

19. A trusted content usage monitoring system as claimed in claim 1, wherein said content rendering device is an audio renderer and said content comprises audio data.

20. A trusted content usage monitoring system as claimed in claim 1, wherein said content rendering device is a video renderer and said content comprises video data.

21. A trusted content usage monitoring system as claimed in claim 1, wherein said content rendering device is a text renderer and said content comprises text data.

22. A trusted content usage monitoring system as claimed in claim 1, wherein said content rendering device is an graphics renderer and said content comprises graphics data.

23. A trusted content usage monitoring system as claimed in claim 1, wherein said content rendering device is an application execution device and said content comprises application data.

24. A trusted content usage monitoring system as claimed in claim 1, wherein said processor system is configured to generate said unique identifier indicative of said content by intermittently sampling said content during rendering by said content rendering device.

25. A trusted content usage monitoring system as claimed in claim 24, wherein said sampling occurs at predetermined intervals during said rendering.

26. A trusted content usage monitoring system as claimed in claim 24, wherein said sampling occurs at randomized intervals during said rendering.

27. A method of operating a trusted content usage monitoring system to monitor content usage, comprising the steps of:
    receiving content via an interface;
    rendering said content via a content rendering device;
    generating a unique identifier indicative of said content via a processor system including at least one processor; and
    generating a trusted packet comprising said unique identifier via the processor system, said trusted packet being signed using a trusted key by said trusted content usage monitoring system, said trusted content usage monitoring system having at least one mode of operation in which rendering said content cannot be decoupled from generating said identifier, wherein said processor system is configured to generate said trusted packet only if a predetermined minimum portion of said content has been rendered by said content rendering device.

28. A data processing system comprising a trusted content usage monitoring system as claimed in claim 1.

29. A data processing system as claimed in claim 28, wherein said data processing system comprises a trusted component and a non-trusted component.

30. A data processing system as claimed in claim 29, wherein said interface is configured to receive said content from said non-trusted component.

31. A trusted content usage monitor as claimed in claim 1, said trusted packet further comprises a random number which varies from trusted packet to trusted packet.

* * * * *